(12) United States Patent
Engdahl et al.

(10) Patent No.: US 10,108,201 B2
(45) Date of Patent: Oct. 23, 2018

(54) VEHICLE CONTROL SYSTEM AND METHOD FOR AUTOMATED DRIVING OF A SPECIFIC LANE FOR CONTINUOUS SUPPLY WITH ELECTRICAL ENERGY

(71) Applicant: SIEMENS AKTIENGESELLSCHAFT, Munich (DE)

(72) Inventors: Henrik Engdahl, Erlangen (DE); Juergen Francke, Berlin (DE); Frank Gerstenberg, Berlin (DE); Oliver Graebner, Neubiberg (DE); Michael Lehmann, Erlangen (DE); Goeran Saenger, Berlin (DE); Florian Buehs, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/634,002

(22) Filed: Jun. 27, 2017

(65) Prior Publication Data

US 2017/0371350 A1 Dec. 28, 2017

(30) Foreign Application Priority Data

Jun. 27, 2016 (DE) .................. 10 2016 211 483

(51) Int. Cl.
*G05D 1/02* (2006.01)
*G01C 21/00* (2006.01)
(Continued)

(52) U.S. Cl.
CPC ....... *G05D 1/0285* (2013.01); *B60K 31/0058* (2013.01); *B60L 5/24* (2013.01);
(Continued)

(58) Field of Classification Search
CPC .... G05D 1/0285; G05D 1/021; G05D 1/0229; G05D 1/0274; G05D 1/0276;
(Continued)

(56) References Cited

U.S. PATENT DOCUMENTS 5,464,082 A * 11/1995 Young ................ B60L 5/18
191/2
8,678,150 B2 * 3/2014 Andre ................ B60L 5/42
191/33 R
(Continued)

FOREIGN PATENT DOCUMENTS

CA 2929314 A1 5/2015
DE 102011076623 A1 11/2012
(Continued)

OTHER PUBLICATIONS

Sachse, Thomas, et al. : "Intelligent traffic control and optimization with cooperative systems on the eHighway". In: 2014 International Conference on Connected Vehicles and Expo (ICCVE), Nov. 3-7, 2014.

*Primary Examiner* — Russell Frejd
(74) *Attorney, Agent, or Firm* — Laurence Greenberg; Werner Stemer; Ralph Locher

(57) ABSTRACT

A vehicle control facility for the automated control of an electrical road vehicle for a route system with an energy-supply system that includes a lane-bound energy supply line, in particular an overhead line system. A position-determining unit determines a geographical position of the electrical road vehicle. A specific-lane-determining unit determines position data for a specific lane assigned to the lane-bound energy supply line. A communication interface transmits current relative positions of infrastructure features with respect to the electrical road vehicle to an external central specific-lane-determining facility and receives position data. A vehicle-control unit controls the electrical road vehicle (Continued)

Figure 1:
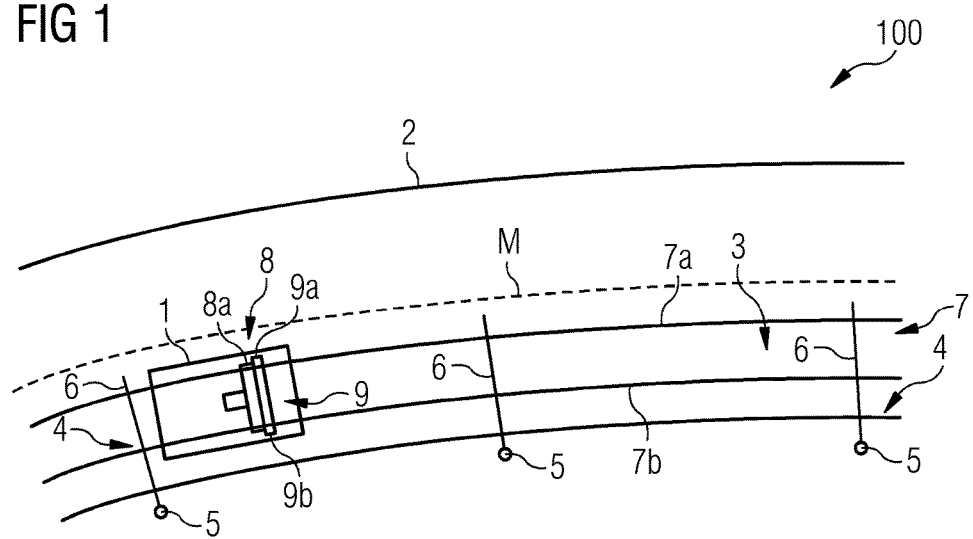

with respect to the determined specific lane in dependence on the determined relative position of the specific lane.

19 Claims, 4 Drawing Sheets

(51) Int. Cl.
| | |
|---|---|
| G01C 21/12 | (2006.01) |
| G01C 21/34 | (2006.01) |
| B60L 9/00 | (2006.01) |
| B60L 5/24 | (2006.01) |
| B60M 1/12 | (2006.01) |
| G06Q 50/30 | (2012.01) |
| G06K 9/00 | (2006.01) |
| G08G 1/00 | (2006.01) |
| B60W 30/12 | (2006.01) |
| B60K 31/00 | (2006.01) |
| B62D 1/28 | (2006.01) |
| G06T 7/70 | (2017.01) |

(52) U.S. Cl.
CPC .......... *B60L 9/00* (2013.01); *B60M 1/12* (2013.01); *B60W 30/12* (2013.01); *B62D 1/28* (2013.01); *G01C 21/005* (2013.01); *G01C 21/12* (2013.01); *G01C 21/3407* (2013.01); *G05D 1/021* (2013.01); *G05D 1/0229* (2013.01); *G05D 1/0274* (2013.01); *G05D 1/0276* (2013.01); *G06K 9/00798* (2013.01); *G06Q 50/30* (2013.01); *G06T 7/70* (2017.01); *G08G 1/20* (2013.01); *B60L 2240/62* (2013.01); *B60T 2201/087* (2013.01); *G05D 2201/02* (2013.01); *G05D 2201/0213* (2013.01)

(58) Field of Classification Search
CPC ........ G05D 2201/0213; G05D 2201/02; B60L 9/00; B60L 5/24; B60L 2240/62; B60M 1/12; G01C 21/3407; G01C 21/005; G01C 21/12; G08G 1/20; B62D 1/28; B60K 31/0058; B60W 30/12; G06K 9/00798; G06Q 50/30; G06T 7/70; B60T 2201/087

See application file for complete search history.

(56) References Cited

U.S. PATENT DOCUMENTS

| | | | |
|---|---|---|---|
| 8,838,320 | B2 | 9/2014 | Stratton et al. |
| 9,346,361 | B2 | 5/2016 | Francke et al. |
| 2007/0062771 | A1* | 3/2007 | Li .............. B60L 5/18 191/50 |
| 2011/0094846 | A1* | 4/2011 | Wu ............ B60B 27/023 192/64 |
| 2011/0106349 | A1* | 5/2011 | Sakita ............ B60L 11/1801 701/22 |
| 2015/0165911 | A1* | 6/2015 | Gerstenberg ........ B60L 5/16 191/85 |
| 2015/0239349 | A1* | 8/2015 | Keil ............... B60L 5/08 191/59.1 |
| 2015/0325061 | A1 | 11/2015 | Gerstenberg et al. |
| 2015/0352959 | A1* | 12/2015 | Buehs ............ B60L 5/08 191/59.1 |
| 2016/0375796 | A1* | 12/2016 | Gruenjes ............ B60L 5/24 191/33 R |

FOREIGN PATENT DOCUMENTS

| | | |
|---|---|---|
| DE | 102012205276 A1 | 10/2013 |
| DE | 102012210519 A1 | 12/2013 |
| DE | 112013001814 T5 | 2/2015 |
| FR | 2949578 A1 | 3/2011 |
| WO | 2011023860 A2 | 3/2011 |

\* cited by examiner

VEHICLE CONTROL SYSTEM AND METHOD FOR AUTOMATED DRIVING OF A SPECIFIC LANE FOR CONTINUOUS SUPPLY WITH ELECTRICAL ENERGY

CROSS-REFERENCE TO RELATED APPLICATION

This application claims the priority, under 35 U.S.C. § 119, of German patent application DE 10 2016 211 483.2, filed Jun. 27, 2016; the prior application is herewith incorporated by reference in its entirety.

BACKGROUND OF THE INVENTION

Field of the Invention

The invention relates to a vehicle control facility for the automated control of an electrical road vehicle for a route system with an energy-supply system with a lane-bound energy supply line, in particular an overhead line system. The invention also relates to an electrical road vehicle for a route system with an energy-supply system with a lane-bound energy supply line, in particular an overhead line system. The invention also relates to a central specific-lane-determining facility for a route system with a lane-bound-energy-supply system, in particular an overhead line system. The invention further relates to a transport system with a route system with a lane-bound energy supply line, in particular an overhead line system. Finally, the invention also relates to a method for monitoring and controlling a trajectory of an electrical road vehicle on a route system with a lane-bound energy supply line, in particular an overhead line system.

Electrical transport systems for transporting goods and persons with contact lines for supplying road vehicles with electrical energy are used in numerous different variants. When lane-bound energy-supply systems are used for non-rail-bound vehicles, in particular road vehicles, typically DC-based overhead-line systems are used. These have the advantage of reduced space requirements and increased safety.

One future field of application for lane-bound supply systems is goods transportation on highways.

In this context, during the journey, electrified vehicles, in particular electrified trucks, draw electrical energy from contact lines, in particular overhead cables, erected along highways. Such electrified trucks are equipped with a hybrid system with a drive comprising an internal combustion engine and an electric motor. Electrified trucks use a current collector, also referred to as a pantograph, to draw electrical drive power continuously from an overhead line.

In this context, contact lines should be understand as being any type of electrical supply lines with which a lane-bound supply of electrical energy for electrical vehicles is possible. In the case of a multi-polar energy-supply system, the term contact line means differently polarized lines in the system, i.e. a plurality of current conductors or contact wires.

With all embodiments of electrical vehicles with pantographs, there is a need to compensate for the movement of the vehicle in the transverse direction. A transport system with a non-rail-bound vehicle supplied with energy via overhead lines is, for example, known from commonly assigned U.S. Pat. No. 9,346,361 B2 and its counterpart German published patent application DE 10 2011 076 623 A1. The non-rail-bound vehicle disclosed therein comprises a current collector for feeding electrical energy from a two-pole overhead line with contact wires configured as forward and return conductors that can each be contacted by at least one contact strip of the current collector. In an exemplary embodiment described in said patent application, the current collector comprises two support extension arms which are tiltably and rotatably hinged to both the vehicle and a rocker bearing the contact strips such that the rocker can be both raised and lowered and can also be moved transversely to the direction of travel in order in this way to compensate for changes to the position of the vehicle in the transverse direction.

The specification of U.S. Pat. No. 9,346,361 B2 and DE 10 2011 076 623 A1 describes a non-rail-bound vehicle with a current collector which compensates lateral inaccuracies in the steering the vehicle.

An actual position of the vehicle relative to the contact wires is detected by means of a position sensor embodied in the form of a video camera affixed to the vehicle. The vehicle comprises a closed-loop control system which determines a setpoint variable from a comparison of the actual detected position with a predefined target position of the vehicle relative to the contact wires. In accordance with the setpoint variable determined, the regulation facility controls a positioning drive for the lateral compensation of a rocker bearing the contact strips. The actual position is based on the automatic detectability of the contact wires on the video images recorded, for example by using so-called pattern matching.

However, in poor visibility conditions, such as, for example, darkness, fog or precipitation, this procedure is greatly impaired or even impossible. It is also necessary for the video camera lens and the contact wires to be as free of contamination as possible—and this is virtually unachievable.

An overhead line of a transport system of this kind is typically arranged parallel to the center of the roadway. In many cases, the overhead line also extends chordally, for example in a curve. In this case, the angles between the extension arms of the current masts are dependent upon different factors, for example on the curve radius or the type of tensioning of the overhead line. With pantographs used to date, horizontal and vertical guides are used for the sliding contacts in order to maintain contact with the overhead line independently of the horizontal and vertical overhead line position, the course of the overhead line and the vehicle position or the vehicle movement in the greatest possible range.

Unlike traction and/or trolley current collectors, this concept has several degrees of freedom in the vertical and horizontal spatial axis, which overall results in a very complex mechatronic system. Two different sensor systems are used for the detection of overhead lines. An approximately perpendicularly oriented laser scanner acquires the overhead-line position from the electrified vehicle. Depending upon the installation site, the scanner detects the overhead line shortly before or even after the pantograph contact strips. While the pantograph contact strips are in contact with the overhead line, position switches on the edge of the contact strips identify when the overhead line leaves the permissible operating region on the contact strip.

The regulation of the vertical contact strip position is based on information from a laser scanner. Since the overhead line is monitored in the vicinity of the contact strip, for example shortly before or after the contact strip, the time for processing the signal and the subsequent correction of the vertical contact strip position is only very short. Therefore, this conventionally requires high control dynamics resulting in high requirements for the control system and, above all, for the drives for the horizontal and vertical guidance of the pantograph. The necessary torques and accelerations require high energy consumption and discharge enormous forces into the entire mechanical structure, which is consequently larger and heavier. Moreover, there is a significant increase in the costs of the structure generally and in particular also for the very powerful drives.

The high accelerations during the pantograph position control also occur due to greatly restricted information with respect to the further course of the overhead line. This can be attributed to the fact that, conventionally, the overhead line can only be detected in a short region before the current collector. Therefore, the reaction time for controlling the pantograph is very short and hence high accelerations, forces and torques occur.

Although methods for the detection of the overhead line with the aid of optical measuring methods and active features on the infrastructure are known, since these are based on optical measuring methods, they are all weather-dependent, which, in the case of bad weather, such as for example rain, snow or fog, results in significant difficulties or even total failure of the transport system.

In German published patent application DE 10 2012 205 276 A1, a relative position of a current collector with respect to contact wires is determined with the aid of detecting means. A steering assistance system steers the vehicle automatically in dependence on the detected relative position. The detecting means comprise a position-determining system to determine a current position of the vehicle on the lane and a database with stored contact-wire positions for the contact wires along the lane. The detecting means are embodied to calculate the relative position from the current vehicle position determined and the assigned contact-wire positions.

U.S. Pat. No. 8,838,320 B2 (see, German publication DE 11 2013 001 814 T5) describes a system for guiding an off-highway truck along a roadway with respect to an overhead line. A position of a truck on the roadway is determined by detecting two or more roadside objects and used, with knowledge of a position of the overhead line, to determine a relative position of the truck under the overhead line.

"Intelligent traffic control and optimization with cooperative systems on the eHighway", Thomas Sachse, Oliver Gräbner, Meike Möckel, Claus Kaschwich, Jens Plättner, 2014 International Conference on Connected Vehicles and Expo, describes a central traffic control centre with which information on accidents or roadwork can be transmitted to individual vehicles.

SUMMARY OF THE INVENTION

It is accordingly an object of the invention to provide a system, a vehicle, a method and underlying computer program products which overcome the above-mentioned and other disadvantages of the heretofore-known devices and methods of this general type and which provides for an apparatus and a method that achieves permanent contact between a pantograph of an electrified road vehicle with a contact line with which the prior art constraints and difficulties are overcome.

With the foregoing and other objects in view there is provided, in accordance with the invention, a vehicle control facility for an automated control of an electrical road vehicle on a route system with an energy-supply system having a lane-bound energy supply line. The vehicle control facility comprising:

a position-determining unit for determining a relative position of the electrical road vehicle by determining relative positions of infrastructure features with respect to the electrical road vehicle;

a specific-lane-determining unit for determining position data of a specific lane associated with the lane-bound energy supply line, said specific-lane-determining unit including a communication interface for transmitting determined current positions of infrastructure features with respect to the electrical road vehicle from the electrical road vehicle to an external central specific-lane-determining facility and for receiving position data determined by the central specific-lane-determining facility on a basis of the current relative positions of infrastructure features with respect to the electrical road vehicle and information acquired and/or determined centrally with respect to a course or position of the specific lane to be driven including a current relative position of a specific lane with respect to the current position of the electrical road vehicle from the external central specific-lane-determining facility; and a vehicle-control unit for controlling the electrical road vehicle with respect to the determined specific lane in dependence on the determined relative position the specific lane.

In other words, the novel vehicle control system, or device, is used for the automated control of an electrical road vehicle for a route system with an energy-supply system with a lane-bound energy supply line, in particular an overhead line system. In this context, "automated control" should in particular be understood as being semi-automated control. In this context, steering commands can be output and implemented automatically—i.e. without intervention on the part of the driver—or the driver can be given instructions to correct steering behavior. The vehicle control facility according to the invention comprises a position-determining unit for determining a relative position of the electrical road vehicle. This relative position is identified by determining current relative positions of infrastructure features with respect to the electrical road vehicle. The determination of the specific position relative to the infrastructure can, for example, be performed by self-localization or with the aid of information from external position-detecting facilities. A further part of the vehicle control facility according to the invention is a specific-lane-determining unit for determining position data for a specific lane assigned to the lane-bound energy supply line. In this context, a specific lane should be understood to be a lane or a trajectory to be traversed on which the electrical road vehicle can maintain electrical contact with the lane-bound energy supply line. Additionally, the specific lane should be arranged on the route used such that, allowing for the lateral tolerances, when traveling on the specific lane, an electrical road vehicle does not leave its own lane, i.e. the lane specified in the traffic regulations. Moreover, the width of the specific lane can also be specified in dependence on a width of the current collector used or the contact strip thereof, wherein the lane width is selected such that a vehicle with a center line positioned over the specific lane in each case is in full electrical contact with the contact line. To determine the position data for the specific lane, the specific-lane-determining unit comprises a communication interface for transmitting the determined relative position of the electrical road vehicle from the electrical road vehicle to an external central specific-lane-determining facility and for receiving position data determined by the central specific-lane-determining facility on the basis of the current relative position of infrastructure features with respect to the electrical road vehicle and information acquired and/or determined centrally with respect to the course or the position of the specific lane to be driven, comprising a current relative position of a specific lane with respect to the current position of the electrical road vehicle from the external central specific-lane-determining facility.

Advantageously, the vehicle control facility according to the invention receives information acquired and/or determined centrally with respect to the course or position of the specific lane to be driven. The centrally acquired information is more broadly based than specific-lane-position data determined by only one electrical vehicle. This enables the determination of the position of a specific lane to be performed particularly reliably.

The determination of the specific lane can, for example, be performed with the aid of external information, for example from databases, but also by taking into account information, determined by the detection of infrastructure elements or the position and course thereof and by the electrical road vehicle in question or also other road vehicles provided with detection facilities. The vehicle control facility according to the invention also comprises a vehicle-control unit for controlling the electrical road vehicle with respect to the determined specific lane in dependence on the determined relative position of the specific lane. The control should preferably be performed automatically, i.e. the determined position data is used to determine a correction trajectory or corrective route automatically which is subsequently traversed by the electrical road vehicle preferably automatically so that, after traversing the corrective route, the electrical road vehicle is again located on the specific lane.

If it should be identified from the processing of the position data that the electrical road vehicle in question is already located on the specific lane, there is no intervention in the control of the electrical road vehicle. Alternatively, the traversing of the corrective route can also be controlled by a driver who traverses the corrective route with reference to a diagram displayed to the driver, for example a navigation map with a marked route or direction and route information. Advantageously, the vehicle control facility according to the invention can be used to dispense with a correction-initiated change to the location and position of the current collector of an actual electrical vehicle, for example in the horizontal direction or in the transverse direction when the position of the electrical vehicle relative to lane-bound energy supply line changes. Therefore, this enables complicated drive mechanics and control electronics for the current collector system, for example a pantograph, to be dispensed with or at least be designed more simply. It is also possible for the current collector system to be smaller and less robust since the torques and accelerations and associated strong forces that conventionally act on the current collector system are reduced or eliminated. It is also possible for drive motors for the corrective movements of a current collector either to have smaller dimensions or to be dispensed with entirely.

The electrical road vehicle according to the invention for a route system with an energy-supply system with a lane-bound energy supply line, in particular an overhead line system, comprises a vehicle control facility according to the invention. The electrical vehicle according to the invention is, for example, an electrically operated truck. Due to their high energy consumption, electrified trucks are dependent upon electrical contact lines if they are required to apply a significant part of the traction energy by means of electrical energy.

The central specific-lane-determining facility according to the invention for a route system with a lane-bound-energy-supply system, in particular an overhead line system, comprises a database in which position data for a specific lane is stored. This means that data stored in the database reflects the location—preferably the geographical location—of the specific lane or the course thereof. A further part of the central specific-lane-determining facility according to the invention is a receiving interface for receiving position data relating to a relative position of a specific lane with respect to infrastructure features and/or data relating to a relative position of infrastructure features with respect to an electrical road vehicle. The data with respect to the relative position of the infrastructure features, for example positions of contact-line masts or positions of roadway markings, or also positions of special position markings, can for example be acquired or determined by one or more road vehicles and forwarded to the central specific-lane-determining facility. Similarly, it is also possible for the position data to be transmitted, for example, from an electrical road vehicle to the central specific-lane-determining facility. In this context, the central specific-lane-determining facility is preferably a stationary installation and communicates with at least one, preferably a plurality of, electrical road vehicle/s. The central specific-lane-determining facility according to the invention also comprises a central computing unit for determining position data for a specific lane comprising a current relative position of the specific lane with respect to the current position of a road vehicle on the basis of the position data for the specific lane and the data relating to a relative position of infrastructure features with respect to an electrical vehicle. The central computing unit combines all the data, for example with the aid of a so-called SLAM algorithm (simultaneous localization and mapping) and calculates very precise position data for a specific lane based on the position data for the infrastructure features.

For example, the position data acquired by a plurality of electrical vehicles is used for a comparison with position data for the specific lane that is already available in the database and, if applicable, a correction of the available data. A further part of the central specific-lane-determining facility according to the invention is an output interface for transmitting the determined position data for the specific lane to an electrical road vehicle. The central processing of position data can be used to determine a comprehensive picture of the current course of a specific lane and forward the information in question to all the electrical vehicles. Advantageously, the central specific-lane-determining facility according to the invention can also be used to detect short-term changes and updates to the position of the specific lane centrally and to notify them to a plurality of electrical road vehicles so that these vehicles are always provided with current information with respect to a course of a specific lane.

The transport system according to the invention with a route system with a lane-bound energy supply line, in particular an overhead line system, comprises at least one electrical road vehicle according to the invention and preferably a central specific-lane-determining facility according to the invention. In this context, a transport system should be understood to mean the entire system consisting of vehicles, energy supply, road guidance and any further facilities, such as, for example, traffic routing facilities etc.

With the method according to the invention for monitoring and controlling a trajectory of an electrical road vehicle on a route system with a lane-bound energy supply line, in particular an overhead line system, a current relative position of the electrical road vehicle with respect to infrastructure features is determined. The determination of the relative position of the electrical road vehicle can also take place by the detection of infrastructure components and the distances or relative position thereof with respect to the electrical road vehicle in question. Furthermore, position data is determined for a specific lane assigned to a lane-bound energy supply line.

To this end, the determined relative position of infrastructure features with respect to the electrical road vehicle is transmitted from the electrical road vehicle to a central specific-lane-determining facility and position data determined by the central specific-lane-determining facility on the basis of the current relative position of infrastructure features with respect to the electrical road vehicle and information acquired and/or determined centrally with respect to the course or the position of the specific lane to be driven which comprise a current relative position of a specific lane with respect to the current position of the electrical road vehicle are received from the central specific-lane-determining facility by the electrical road vehicle. The electrical road vehicle is controlled with respect to the determined specific lane in dependence on the determined relative position of the specific lane. That is, in the case of a deviation of the electrical road vehicle from the specific lane, a distance is determined which has to be traversed by the electrical road vehicle in order to arrive at the determined specific lane and the vehicle is controlled over the distance determined to the specific lane.

The primarily important components of the vehicle control facility according to the invention and the central specific-lane-determining facility according to the invention can be predominantly embodied in the form of software components. This in particular relates to the position-determining unit, the specific-lane-determining unit, the vehicle-control unit and the central computing unit. However, in principle, these components can also to some extent, particularly where particularly fast calculations are involved, be implemented in the form of software-supported hardware, for example FPGAs (field-programmable gate arrays) or the like. The required interfaces, for example, when this only involves a transfer of data from other software components, can likewise be designed as software interfaces. However, they can also be embodied as hardware-based interfaces actuated by means of suitable software.

A largely software-based implementation has the advantage that electrical road vehicles used to date and existing traffic-routing facilities can also be upgraded in a simple manner by means of a software update in order to operate in the manner according to the invention. In this respect, the object is also achieved by a corresponding computer program product with a computer program that can be loaded directly into a storage facility of an electrical road vehicle and/or a storage facility of a central traffic routing facility, with program sections for carrying out all steps of the method according to the invention when the program is executed in the electrical road vehicle or the central traffic routing facility. In addition to the computer program, a computer program product of this kind can optionally comprise additional constituents such as, for example, documentation and/or additional components and also hardware components, such as, for example, hardware keys (dongles etc.) for using the software. A programmed central traffic routing facility of this kind can, therefore, in particular carry out the functions of the central specific-lane-determining facility according to the invention.

Transportation to the memory unit and/or storage on or in the memory unit of the electrical vehicle or the central traffic routing facility can take place by means of a computer-readable medium, for example a memory stick, a hard disk or a another kind of transportable or permanently installed data carrier on which the program sections of the computer program which can be read and executed by a computer unit are stored. To this end, the computer unit can, for example, comprise one or more interacting microprocessors or the like.

The dependent claims and the following description each contain particularly advantageous embodiments and developments of the invention. Here, in particular the claims of one claims category can also be developed analogously to the dependent claims of another claims category. In addition, within the context of the invention, the various features of different exemplary embodiments and claims can also be combined to form new exemplary embodiments.

In one preferred embodiment of the vehicle control facility according to the invention, the specific lane is arranged such that an electrical road vehicle travelling on the specific lane can utilize the lane-bound energy supply line optimally without the electrical road vehicle losing contact with the lane-bound energy supply line. In this context "optimal usage" should be understood to mean maximum possible contact or a maximum possible contact surface between the current collector of the electrical road vehicle and the lane-bound electrical supply line. This achieves maximum energy transmission during the electrical vehicle's journey thus enabling a quick and efficient journey.

In one particularly comfortable embodiment of the vehicle control facility according to the invention, the vehicle-control unit is configured for the automated driving of the specific lane on the basis of the determined relative position of the specific lane. With this variant, the driver is supported by an automated lane-holding-assistance system which holds the electrical road vehicle on the determined specific lane without driver intervention. The driver is advantageously able to concentrate on braking and acceleration maneuvers and other important operator functions of the electrical road vehicle. In addition, automated correction of the electrical vehicle and hence of the current collector of the electrical vehicle achieves high availability of overhead-line operation with only a few forced disconnection processes and contact losses due to the specific lane being left inadvertently.

For example, it can also be the case that, as a result of impairment due to bad weather or a fault, an individual vehicle is not itself able to determine the position of a specific lane. In this situation, communication with the central specific-lane-determining facility provides an alternative source of information enabling the vehicle control facility in question nevertheless to determine a position of a specific lane and hence permitting the associated electrical road vehicle to proceed despite adverse circumstances.

In one advantageous embodiment of the vehicle control facility according to the invention, the position-determining unit is configured additionally to determine a current position of the electrical road vehicle on the basis of position data from a global navigation system and the determined communication interface of the specific-lane-determining unit is configured to transmit the current position of the electrical road vehicle to the central specific-lane-determining facility. The position measurements of the electrical road vehicles can also only take place at known support points where they are regularly compared and interpolated between the support points with suitable additional sensor data. The precise determination of position data can also be performed using so-called dead-reckoning data from the vehicle, such as, for example, the wheel speed or a steering angle, together with the position data determined on the basis of the infrastructure features, in order to obtain position data. It is also possible for data from lane-identifying systems to be compared with the other data in order to determine the position of a vehicle, in particular relative to a specific lane.

Electrical road vehicles are typically already equipped with navigation systems as standard so that no additional sensor elements and evaluation systems have to be installed for the determination of the position of the electrical road vehicle in question. If a position is to be determined particularly precisely, it is, for example, additionally possible to determine a relative position with respect to individual infrastructure features with the aid of sensors. If the exact position of the individual infrastructure features is known, this procedure enables a particularly precise determination of the position of an electrical road vehicle. This kind of position determination also functions when it is not possible to receive satellite signals, for example in tunnels or other locations in satellite reception shadows.

To this end, the vehicle control facility according to the invention preferably comprises a navigation-data-receiving unit and/or a sensor unit for detecting a relative position of infrastructure features and or for detecting the position of the lane-bound energy supply line.

Particularly preferably, the communication interface of the vehicle control facility according to the invention is configured to forward determined position data for the lane-bound energy supply line to the external central specific-lane-determining facility. This enables position data to be collected and processed centrally and made available to a plurality of traffic participants thus achieving increased reliability and precision in the determination of the position data for the specific lane.

In one particularly preferred embodiment of the vehicle control facility according to the invention, the vehicle control facility additionally comprises a lane-identifying system for determining a transversal position of the electrical road vehicle on a lane, a comparison unit for comparing the transversal position of the electrical road vehicle determined by the lane-identifying system with the determined relative position of infrastructure features with respect to the electrical road vehicle and a correcting unit for correcting a determined relative position on the basis of a result of the comparison. The lane-identifying system enables the determined position data of the electrical vehicle to be monitored and corrected. This enables greater precision to be achieved in the determination of corrective route for driving the specific lane.

In one embodiment of the electrical road vehicle according to the invention for a route system with an energy-supply system with a lane-bound energy supply line, the electrical road vehicle comprises a pantograph or a current collector system that is rigid, i.e. non-displaceable, in the transverse direction. This embodiment is particularly simple to implement and permits a more robust and cost-efficient current collector design.

In one preferred variant of the transport system according to the invention, the transport system comprises infrastructure features, the positions of which are stored in the database of the central specific-lane-determining facility. Advantageously, this position data can be used by the central specific-lane-determining facility to determine a position or the course of the specific lane particularly precisely based on the detected infrastructure features.

Other features which are considered as characteristic for the invention are set forth in the appended claims.

Although the invention is illustrated and described herein as embodied in a system for the automated driving of a specific lane for continuous supply with electrical energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

Figure 2:
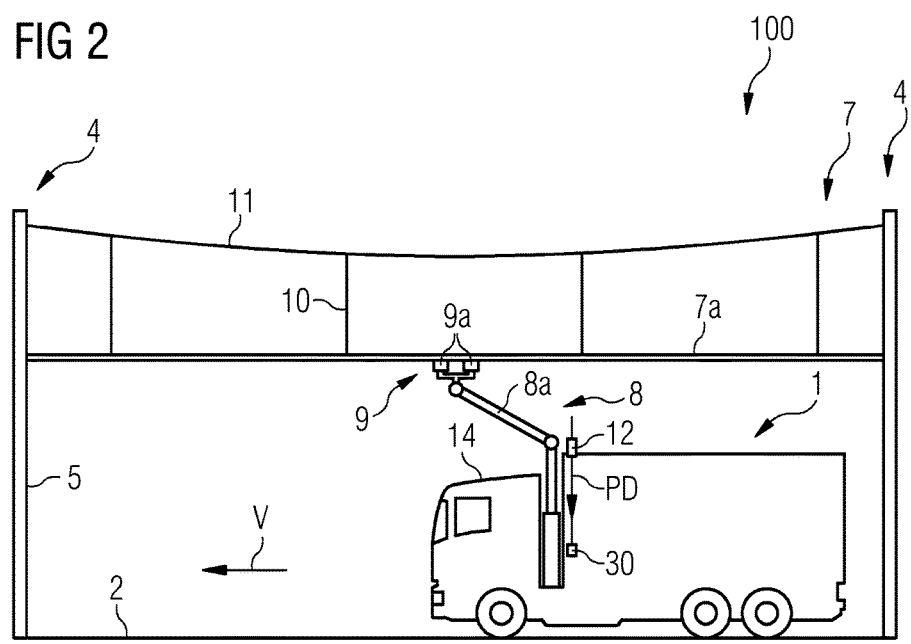
Figure 3:
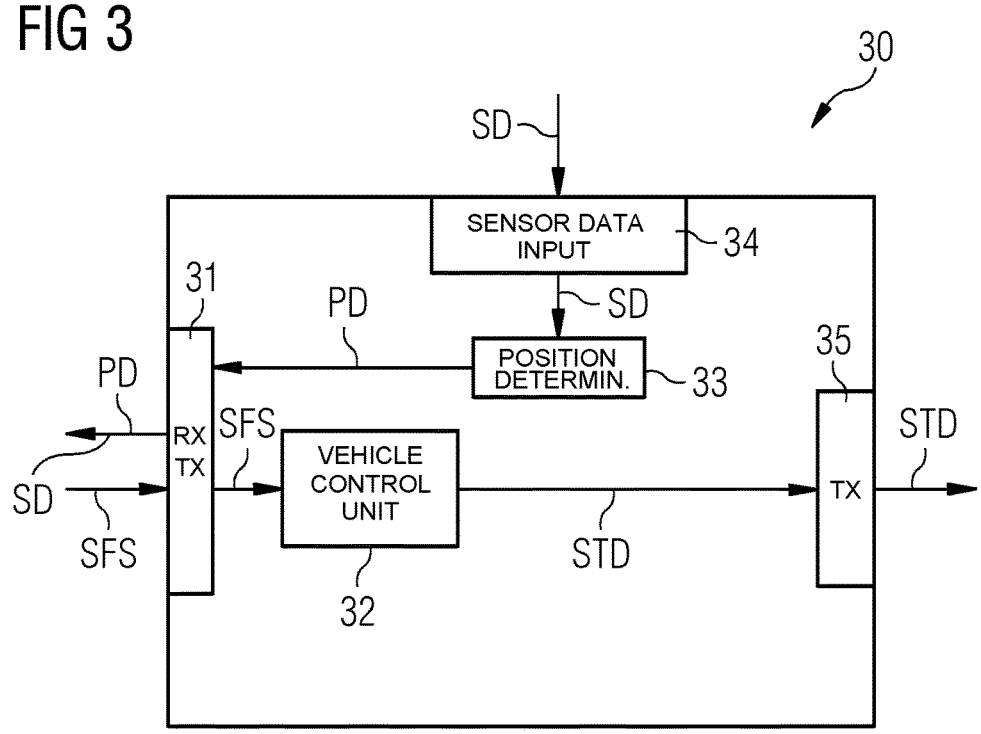
Figure 4:
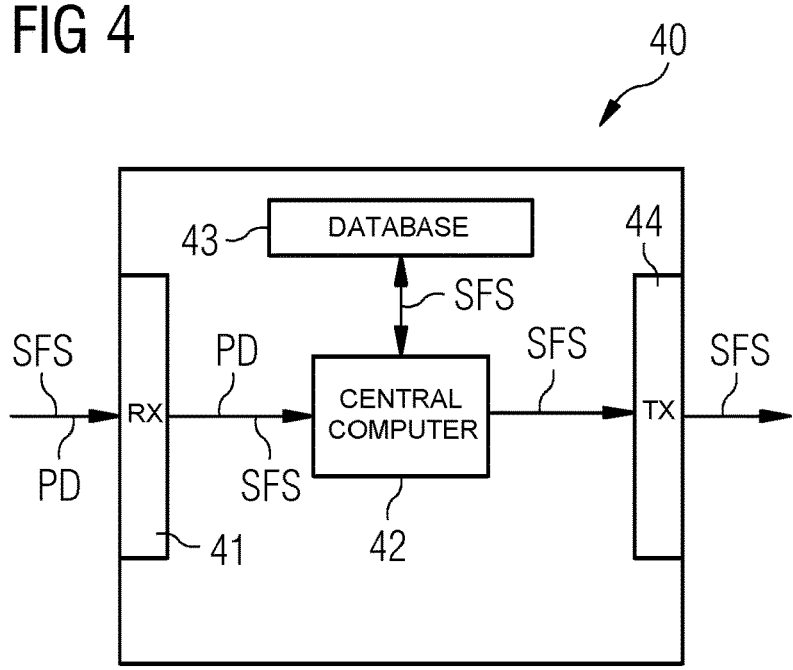
Figure 5:
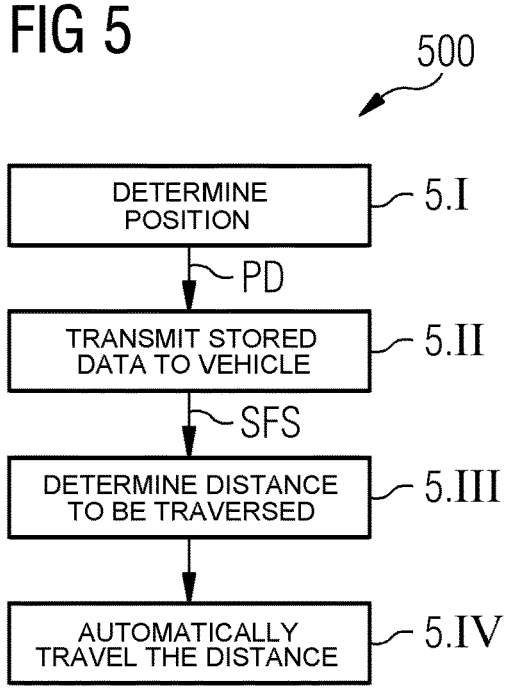

FIG. 1 top view of a transport system according to an exemplary embodiment of the invention;

FIG. 2 a side view of a transport system with a contact-line-coupling system according to an exemplary embodiment of the invention;

FIG. 3 a schematic representation of an electrical road vehicle according to an exemplary embodiment of the invention;

FIG. 4 a schematic representation of a central specific-lane-determining facility according to an exemplary embodiment of the invention; and FIG. 5 a flow diagram illustrating a method for monitoring and controlling a trajectory of an electrical road vehicle on a route system with a lane-bound energy supply line according to an exemplary embodiment of the invention.

DETAILED DESCRIPTION OF THE
INVENTION

Referring now to the figures of the drawing in detail and first, particularly, to FIG. 1 thereof, there is shown a segment of a lane-bound transport system 100 according to an exemplary embodiment of the invention comprising an electrical road vehicle 1 according to an exemplary embodiment of the invention. The transport system 100 also comprises a roadway 2 with a central strip M and an energy-supply system with a contact line 7 with two contact wires 7a, 7b suspended on contact-line masts 4 over the lanes (only shown on one lane). The contact-line masts 4 comprise vertical post-like supporting elements 5 on the upper ends of which crossarms 6 are mounted on which the contact line 7 is suspended. The contact line 7 comprises two contact wires 7a, 7b one of which one has a positive potential and the other has a negative potential. The electrical road vehicle 1 shown in FIG. 1 comprises a pantograph 8 with a bracket 8a and a rocker 9 with so-called contact strips 9a and 9b, which are each in contact with one of the two contact wires 7a and 7b.

FIG. 2 illustrates a side view of the transport system 100 shown in FIG. 1. One part of the transport system 100 is an overhead-line system 7 comprising contact wires 7a, 7b embodied as forward and return conductors (only one contact wire 7a can be identified in the side view) extending parallel to one another above a lane of a roadway 2 on which an electrical road vehicle 1 is travelling. To this end, the overhead-line system 7 comprises masts 4 installed to the side of the roadway 2 from which extension arms 6 (see FIG. 1) protrude laterally above a lane of the roadway 2. Also extending over the lane are two bearer cables 11, which are supported by the extension arms 6 (see FIG. 1) and sag therebetween in a catenary shape. On each bearer cable 11, a contact wire 7a, 7b is suspended by means of a plurality of suspension cables 10 the length of which decreases as the distance from the extension arms increases thus enabling an approximately constant contact wire height to be set over the lane of the roadway 2. A suspension cable 10 is secured to a contact wire 7a, 7b by means of a suspension clamp (not shown), the clamping edges of which are in each case held in positive engagement by means of a screw connection in one of two longitudinal grooves in the contact wire 7a, 7b. This type of fastening ensures that the suspension clamps (not shown) do not represent obstacles when the contact wires 7a, 7b slide through the current collector 8 of the electrical road vehicle 1. At the ends of the contact line 7 comprising the contact wires 7a, 7b, the catenary system is tensioned by retensioning facilities (not shown in further detail).

The current collector 8 of the electrical road vehicle 1 comprises two support arms 8a bearing a rocker arrangement 9 with contact strips 9a and 9b (wherein only 9a is shown). The support arms 8a are mounted rotatably about horizontal axes on the vehicle side, thus enabling the rocker arrangement 9 to be raised and lowered by means of a lifting facility (not shown) between a lower resting position in which the current collector 8 is positioned above driver's cabin 14 in the electrical vehicle 1, and an upper working position in which the contact strips 9a and 9b contact the contact wires 7a, 7b. To ensure that the contact strips also remain in contact with the contact wires on a transverse movement of the electrical road vehicle 1, the electrical road vehicle 1 is steered automatically in the direction of a virtual driving line, a so-called specific lane 3 (see FIG. 1), extending centrally below the two contact wires 7a, 7b. This enables, on lateral driving movements and changes to the direction of the contact wires 7a, 7b, the rocker arrangement 9 to be held below the contact wires 7a, 7b such that the contact strips 9a, 9b maintain sliding contact with the contact wires 7a, 7b and thus maintain the energy supply.

The electrical road vehicle 1 also comprises a vehicle control facility 30, which is used for the automated control of the electrical road vehicle 1. The vehicle control facility 30 automatically takes over operating and steering tasks, which are conventionally performed by a driver. The vehicle control facility 30 communicates via a transceiver unit 12 with other units of the transport system 100, such as, for example, a central specific-lane-determining facility (see FIG. 4), which determines position data with respect to the course of the contact line 7 and sends it via the transceiver unit 12 to the vehicle control facility 30. The vehicle control facility 30 is explained in detail with reference to FIG. 3.

FIG. 3 is a schematic representation of the vehicle control facility 30 already shown in FIG. 2. The vehicle control facility 30 shown in FIG. 3 comprises a specific-lane-determining unit 31, which communicates with other units of the transport system 100, such as, for example, a central specific-lane-determining facility 40 (see FIG. 4). The specific-lane-determining unit 31 receives, for example, position data SFS relating to the course of a specific lane from the central specific-lane-determining facility 40 (see FIG. 4). The acquired position data SFS is transmitted to a vehicle control unit 32, which, on the basis of the position data SFS for the specific lane, outputs a control command STD via an output interface 35 in order to steer the electrical road vehicle 1 (see FIG. 1, FIG. 2) in the direction of the determined position of the specific lane. Additionally, during the generation of the control commands STD, account is also taken of position data PD for the electrical road vehicle 1 which was determined by a position-determining unit 33 and indicates a relative position of the electrical road vehicle 1 relative to infrastructure elements. To this end, the position-determining unit 33 receives sensor data SD from a sensor-data-input interface 34 (a location determining unit), which is connected to different sensors of the electrical road vehicle 1. For example, these sensors comprise optical detectors or radar sensors or antenna, with which distances with respect to infrastructure elements of the transport system 100 are measured or, for example, additionally GPS data is received.

The determined position data PD for the electrical road vehicle 1 is, as shown in FIG. 3, transmitted to the specific-lane-determining unit 31 in order to be included in a determination of position data SFS for a specific lane relative to a position of the electrical road vehicle 1. The position data PD of the electrical road vehicle 1 can also be transmitted to the central specific-lane-determining facility 40 (see FIG. 4) so that it can also be included there in the determination of the position data SFS for a specific lane again relative to a position of the road vehicle 1 in question.

FIG. 4 is a schematic representation of a central specific-lane-determining facility 40 according to an exemplary embodiment of the invention. The central specific-lane-determining facility 40 shown in FIG. 4 comprises a database 43, which stores position data SFS for a specific lane. The specific-lane-determining facility 40 also comprises a receiving interface 41 for receiving position data SFS for a specific lane and/or position data PD for infrastructure features relative to electrical road vehicles 1. The received position data SFS, PD are transmitted to a central computing unit 42, which determines, on the basis of the received position data SFS, PD, position data SFS for a specific lane relative to a position of the electrical vehicle 1 in question. The determined position data SFS, which may differ from the received position data SFS for the specific lane, is transmitted via an output interface 44 to the electrical road vehicles 1.

Therefore, overall advantageously a modular system structure is implemented. This means that the advantages of the invention can be achieved at least partially by using existing vehicle-based components, i.e. the vehicle control facility 30. In conjunction with the resulting increased precision in the determination of the position of a specific lane, the implementation of the additional system components, such as, for example, the central specific-lane-determining facility produces a further improvement.

FIG. 5 is a flow diagram 500 illustrating a method for monitoring and controlling a trajectory of an electrical road vehicle on a route system with a lane-bound energy supply line according to an exemplary embodiment of the invention. In Step 5.I, first data PD relating to a relative position of an electrical road vehicle with respect to a plurality of infrastructure elements is determined. To this end, the electrical road vehicle detects the relative positions of infrastructure elements with the aid of sensors. Furthermore, in Step 5.II, position data SFS assigned to a lane-bound energy supply line is determined for a specific lane. To this end, position data stored in a database for the specific lane is transmitted to the electrical road vehicle. On the basis of the determined position data SFS for the specific lane and the determined relative position for the electrical road vehicle, then in Step 5.III a relative position of the specific lane with respect to the electrical road vehicle and hence automatically a distance to be traversed is determined in order to control the electrical road vehicle in an optimum position on the specific lane. Finally, in Step 5.IV, the determined distance is automatically traversed in order to continue the journey of the electrical road vehicle on the specific lane.

Reference is made once again to the fact that the above-described method and devices are only exemplary embodiments of the invention and that the invention can be varied by the person skilled in the art without departing from the scope of the invention provided it is specified in the claims. The invention is not restricted to usage with overhead lines but can also in principle be applied to other lane-bound energy-supply systems, such as, for example, systems with laterally attached bus bars as supply lines. For the sake of completeness, reference is also made to the fact that the use of the indefinite article "a" or "an" does not preclude the possibility that the features in question may also be present in multiples. Similarly, the term "unit" does not preclude the possibility that the unit comprises a plurality of components, which could also be spatially distributed.

The invention claimed is:

1. A vehicle control facility for an automated control of an electrical road vehicle on a route system with an energy-supply system having a lane-bound energy supply line, the vehicle control facility comprising:
    a position-determining unit for determining a relative position of the electrical road vehicle by determining relative positions of infrastructure features with respect to the electrical road vehicle;
    a specific-lane-determining unit for determining position data of a specific lane associated with the lane-bound energy supply line, said specific-lane-determining unit including a communication interface for transmitting determined current positions of infrastructure features with respect to the electrical road vehicle from the electrical road vehicle to an external central specific-lane-determining facility and for receiving position data determined by the central specific-lane-determining facility on a basis of the current relative positions of infrastructure features with respect to the electrical road vehicle and information acquired and/or determined centrally with respect to a course or position of the specific lane to be driven including a current relative position of a specific lane with respect to the current position of the electrical road vehicle from the external central specific-lane-determining facility; and
    a vehicle-control unit for controlling the electrical road vehicle with respect to the determined specific lane in dependence on the determined relative position the specific lane.

2. The vehicle control facility according to claim 1, wherein the lane-bound energy supply line is an overhead line system.

3. The vehicle control facility according to claim 1, wherein the specific lane is arranged such that an electrical road vehicle travelling on the specific lane utilizes the lane-bound energy supply line optimally without the electrical road vehicle losing contact with the lane-bound energy supply line.

4. The vehicle control facility according to claim 1, wherein said vehicle-control unit is configured for the automated driving of the specific lane based on the determined relative position of the specific lane.

5. The vehicle control facility according to claim 1, wherein said position-determining unit is configured additionally to determine a current position of the electrical road vehicle on a basis of navigation data, and said communication interface of said specific-lane-determining unit is configured to transmit the current position of the electrical road vehicle to the external central specific-lane-determining facility.

6. The vehicle control facility according to claim 5, comprising at least one location detecting unit selected from the group consisting of a navigation-data-receiving unit and a sensor unit for detecting a relative position of the infrastructure features and or for detecting the position of the lane-bound energy supply line.

7. The vehicle control facility according to claim 5, wherein said communication interface is configured to transmit determined position data of the lane-bound energy supply line to the external central specific-lane-determining facility.

8. The vehicle control facility according to claim 1, comprising:
    a lane-identifying system for determining a transversal position of the electrical road vehicle on a lane;
    a comparison unit for comparing the transversal position of the electrical road vehicle determined by the lane-identifying system with the determined relative position of the infrastructure features with respect to the electrical road vehicle; and
    a correcting unit for correcting a determined relative position based on a result of a comparison effected by said comparison unit.

9. An electrical road vehicle for a route system with an energy-supply system having a lane-bound energy supply line, the vehicle comprising a vehicle control facility according to claim 1.

10. The electrical road vehicle according to claim 9, wherein the lane-bound energy supply line is an overhead line system.

11. A transport system with a route system having a lane-bound energy supply line, the transport system comprising:
    at least one electrical road vehicle having a vehicle control facility according to claim 1; and
    a central specific-lane-determining facility having:
        a database containing position data for a specific lane of the route system;
        a receiving interface for receiving position data relating to a relative position of a specific lane with respect to infrastructure features and/or data relating to a relative position of the infrastructure features with respect to the at least one electrical road vehicle;
        a central computing unit for determining position data for a specific lane including a current relative position of the specific lane with respect to the current position of the at least one electrical road vehicle based on the position data for the specific lane and the data relating to a relative position of infrastructure features with respect to the at least one electrical road vehicle; and
        an output interface for transmitting the determined position data for the specific lane to the at least one electrical road vehicle.

12. The transport system according to claim 11, wherein the lane-bound energy supply line is an overhead line system.

13. The transport system according to claim 11, comprising infrastructure features having positions, and wherein the positions are stored in the database of said central specific-lane-determining facility.

14. A central specific-lane-determining facility for a route system with a lane-bound-energy-supply system, comprising:
- a database containing position data for a specific lane of the route system;
- a receiving interface for receiving position data relating to a relative position of a specific lane with respect to infrastructure features and/or data relating to a relative position of the infrastructure features with respect to an electrical road vehicle;
- a central computing unit for determining position data for a specific lane including a current relative position of the specific lane with respect to the current position of the electrical road vehicle based on the position data for the specific lane and the data relating to a relative position of infrastructure features with respect to the electrical road vehicle; and
- an output interface for transmitting the determined position data for the specific lane to the electrical road vehicle.

15. The central specific-lane-determining facility according to claim 14, wherein the lane-bound energy supply line is an overhead line system.

16. A method for monitoring and controlling a trajectory of an electrical road vehicle on a route system with a lane-bound energy supply line, the method comprising:
- determining a current relative position of the electrical road vehicle with respect to infrastructure features;
- determining position data for a specific lane assigned to a lane-bound energy supply line, including the following steps:
  - transmitting the determined current relative position for infrastructure features with respect to the electrical road vehicle from the electrical road vehicle to a central specific-lane-determining facility; and
  - receiving position data determined by the central specific-lane-determining facility based on current relative positions of infrastructure features with respect to the electrical road vehicle and information acquired and/or determined centrally with respect to a course or position of the specific lane to be driven, including a current relative position of a specific lane with respect to the current position of the electrical road vehicle from the central specific-lane-determining facility by the electrical road vehicle; and
- controlling the electrical road vehicle with respect to the determined specific lane in dependence on the determined relative position of the specific lane.

17. The method according to claim 16, wherein the lane-bound energy supply line is an overhead line system.

18. A computer program product, comprising a non-transitory computer-readable medium being a storage facility of an electrical road vehicle and/or a storage facility of a central traffic routing facility with computer-executable program code which is configured to cause a computer to carry out the method according to claim 16 when the computer program is executed in the electrical road vehicle and/or the central traffic routing facility.

19. A non-transitory computer-readable medium on which program sections to be read and executed by a computer unit are stored in order to carry out all steps of the method according to claim 16 when the program sections are executed by the computer unit.

* * * * *